(12) United States Patent
Riff et al.

(10) Patent No.: US 7,333,640 B2
(45) Date of Patent: Feb. 19, 2008

(54) EXTRACTION OF MINUTIAE FROM A FINGERPRINT IMAGE

(75) Inventors: Olivier Riff, Blaesheim (FR); Lionel Martin, Aix En Provence (FR)

(73) Assignee: STMicroelectronics S.A., Montrouge (FR)

( * ) Notice: Subject to any disclaimer, the term of this patent is extended or adjusted under 35 U.S.C. 154(b) by 729 days.

(21) Appl. No.: 10/436,567

(22) Filed: May 13, 2003

(65) Prior Publication Data
US 2003/0215118 A1   Nov. 20, 2003

(30) Foreign Application Priority Data
May 13, 2002  (FR) .................................. 02 05847

(51) Int. Cl.
*G06K 9/00* (2006.01)
*G06F 7/00* (2006.01)
(52) U.S. Cl. ......................... 382/125; 340/5.83; 902/3
(58) Field of Classification Search .................. None
See application file for complete search history.

(56) References Cited
U.S. PATENT DOCUMENTS
5,337,369 A * 8/1994 Shibuya ..................... 382/125

5,420,937 A   5/1995 Davis

OTHER PUBLICATIONS

Preliminary Search Report from French priority application No. 02 05847 filed May 13, 2002.
Maio, D. et al., *Direct Gray-Scale Minutiae Detection in Fingerprints*, IEEE Transactions on Pattern Analysis and Machine Intelligence, IEEE Inc., New York, vol. 19, No. 1, 1997, pp. 27-40, XP000682681.
Ratha et al., *Adaptive Flow Orientation-Based Feature Extraction in Fingerprint Images*, Pattern Recognition, Pergarnon Press Inc., New York, vol. 28, No. 11, Nov. 1, 1995, pp. 1657-1671, XP000539636.

* cited by examiner

*Primary Examiner*—Bhavesh M Mehta
*Assistant Examiner*—Charles Kim
(74) *Attorney, Agent, or Firm*—Lisa K. Jorgenson; James H. Morris; Wolf, Greenfield & Sacks, P.C.

(57) ABSTRACT

A method and a system for extracting a minutia mapping from a digital image, including dividing the image into regions; defining an orientation of each region based on the general direction of grooves in this region; and for each region: unidirectionally filtering the image portion along a direction perpendicular to the orientation of the region; locating the enters of gravity of the grooves based on the intensity of the filtering results, chaining up the barycenters along the general direction of the region grooves, and interpreting the results of the chaining to determine the presence of minutiae of end type or of branch type.

15 Claims, 3 Drawing Sheets

EXTRACTION OF MINUTIAE FROM A FINGERPRINT IMAGE

BACKGROUND OF THE INVENTION

1. Field of the Invention

The present invention relates to the recognition of fingerprints, which is a well tried and tested biometric technique for the identification of individuals. The present invention more specifically relates to the processing of a digital image representing a fingerprint to enable subsequent comparison thereof.

2. Discussion of the Related Art

The fingerprint recognition is performed by examining the papillary line arrangement which forms characteristic points called minutiae. The present invention relates to the processing of a fingerprint image to extract its minutiae therefrom.

As known, fingerprint analysis concentrates on two types of minutiae, especially minutiae of branch type and of end type which, from a statistical point of view, are the most frequent.

FIG. 1 very schematically shows an automatic fingerprint recognition system of the type to which the present invention applies. Such a system is essentially formed of a sensor 1 (formed, for example, of an optical device of digitizer type) connected to a processing unit 2 (PU) in charge of interpreting the measurement results. Processing unit 2 provides, over a connection 3, a signal of authentication or non-authentication of a finger D laid on sensor 1. Processing unit 2 generally has the function of shaping the digital image generated by sensor 1 and of analyzing this image to compare it with one or several images contained in a reference database.

FIG. 2 illustrates, in the form of blocks, a conventional example of a method for extracting minutiae from a digital fingerprint image. Sensor 1 provides a digital image 10 in which grooves (peaks and valleys) of the papillary arrangement are shown in shades of grey. The processing unit then performs (block 11, SB-DIV) a division of the image into image regions or blocks. The block orientation is then determined (block 12, SB-ORIENT) and a filtering is applied thereto to smooth the image (block 13, 2D-FILTER). The use of an oriented filtering enables reducing the calculation time with respect to a global filtering. After the filtering, the image (in fact, the different blocks) is binarized (block 14, BINAR), that is, converted from grey levels to black and white levels, for example, by thresholding, by variance or mean value calculation. The binarization aims at avoiding possible discontinuities of the grooves which would be linked to the image shooting (contrast, brightness differences, etc.). Finally, the image is skeletized (block 15, SQUEL), that is, the lines representing the grooves are thinned down to suppress possible artifacts.

The final image obtained (entirely restored) is used to for the actual minutia search. This search (block 16, RECH) is performed by scanning the entire obtained image skeleton and by detecting the presence of branches or ends. Generally, for each pixel of the skeletized image, the level (black or white) of the eight pixels surrounding it is examined with respect to its own level. In fact, according to whether the skeletization provides a positive or negative image, it is decided to examine the black pixels or the white pixels. If a single one of the eight pixels surrounding it is of the same level as the current (central) pixel, an end has been found, the coordinates of which represent its position in the papillary arrangement. If exactly two of the eight pixels are of the same level as the current pixel, the three pixels belong to a same groove. If exactly three pixels are of the same level as the current pixel, the current pixel most likely represents the coordinates of a minutia of branch type.

Since a relatively reduced number of identical minutiae (from 8 to 17) between two prints is enough to accept the probability of an identity between the two prints, account is generally not taken of minutiae which are too close to one another and which risk resulting from imperfections in the image shooting or in the digitizing techniques. In practice, the interval between two minutiae is determined along the same groove and no account is taken of the minutiae which are not distant by at least a predetermined number of pixels.

The above-described techniques are well known and currently used in image processing. For example, reference may be made to article "Fingerprint Image Enhancement: Algorithm and Performance Evaluation" by Lin Hong, Yifei Wan and Anil Jain, published in IEEE Transactions on Pattern Analysis and Machine Intelligence, Vol. 20, N°8, August 1998, which is incorporated herein by reference.

A disadvantage of current techniques is that they require storage of the entire image at each step of the image processing. In particular, the filtering, the binarization, and the skeletization are performed one after the others for the entire image. Even if these processings are carried out by regions, the entire image is restored before searching the minutiae.

SUMMARY OF THE INVENTION

The present invention aims at providing a method and a system for extracting minutiae from digital fingerprint images, which avoid successive storages of the entire images between each processing step.

The present invention also aims at providing a solution which reduces the amount of calculation necessary to extract the minutiae with respect to conventional methods.

To achieve these and other objects, the present invention provides a method for extracting a minutia mapping from a digital image, comprising the steps of:

dividing the image into regions;

defining an orientation of each region based on the general direction of grooves in this region; and successively for each region:

unidirectionally filtering the image portion along a direction perpendicular to the orientation of the region;

locating the barycenters of the grooves based on the intensity of the filtering results;

chaining up the barycenters along the general direction of the region grooves; and interpreting the results of the chaining to determine the presence of minutiae of end type or of branch type.

According to an embodiment of the present invention, the locating of the barycenters and the chaining are performed line after line in the orientation of the concerned region.

According to an embodiment of the present invention, the interpretation of the results is performed line after line in the orientation of the concerned region.

According to an embodiment of the present invention, the barycenters present at the limit of a region are chained up with those of the next regions.

According to an embodiment of the present invention, the locating of the barycenters of the grooves is performed by centering the intensity in grey levels resulting from the filtering with respect to a mean value, possibly weighted, of the intensity in the concerned region.

According to an embodiment of the present invention, upon locating of the barycenters, the edges of the groove surrounding each barycenter are also located.

According to an embodiment of the present invention, the chaining up of the barycenters takes into account the shape of the edges surrounding them.

The present invention also provides a system for extracting minutiae from a digital fingerprint image.

The foregoing objects, features and advantages of the present invention, will be discussed in detail in the following non-limiting description of specific embodiments in connection with the accompanying drawings.

DETAILED DESCRIPTION

Figure 1:
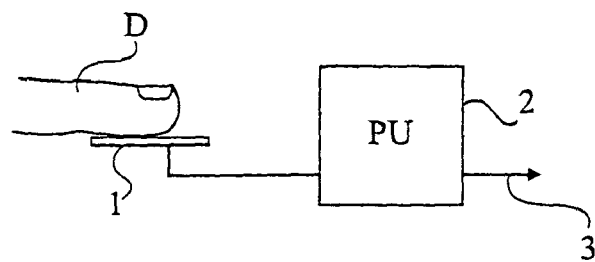
FIG. 1, previously described, very schematically shows an example of a system of the type to which the present invention applies.

For clarity, only those steps which are useful to the understanding of the present invention have been shown in the drawings and will be described hereafter. In particular, the known digital processings have not been described in detail.

Figure 2:
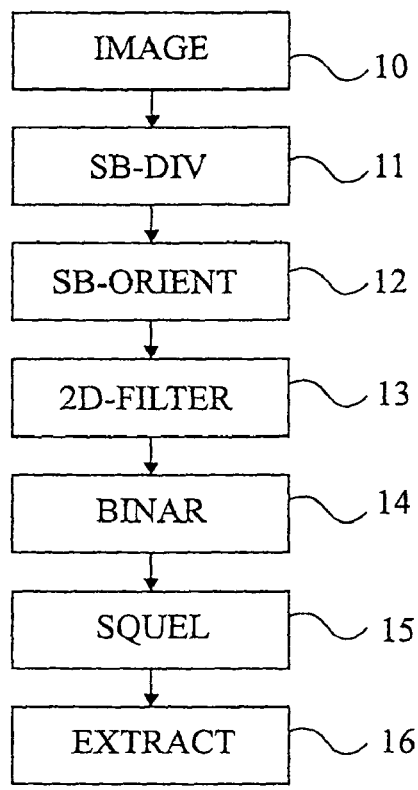
FIG. 2 illustrates, in the form of blocks, a conventional example of a method for extracting minutiae from a digital image.
Figure 3:
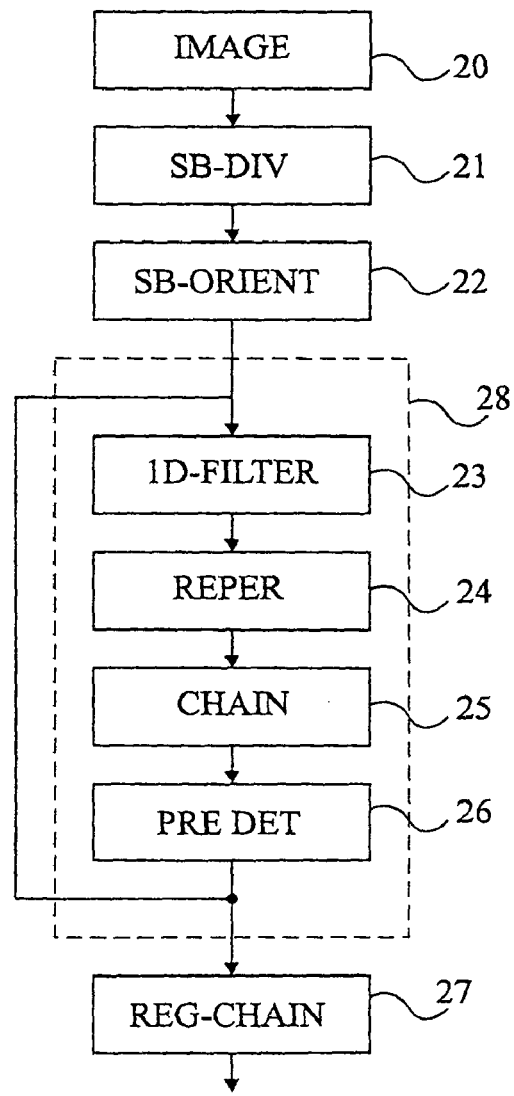
FIG. 3 illustrates, in the form of blocks, an embodiment of the minutia extraction method according to the present invention.

FIG. 3 illustrates in the form of blocks, in a view to be compared with that of FIG. 2, an implementation mode of the minutia extraction method according to the present invention.

As previously, the method starts with a digital fingerprint image (block 20, IMAGE) taken by a system of the type shown in FIG. 1. Conventionally still, the image is divided (block 21, SB-DIV) into regions or blocks to which are applied similar image processings. The blocks are first oriented, that is, the general orientation of the grooves in each block is determined (block 22, SB-ORIENT). This orientation is performed conventionally by an examination of the orientation of the light intensity variations. Then, the present invention performs, line by line approximately in the groove orientation, a one-dimensional filtering (block 23, 1D-FILTER), a search or localization (block 24, REPER) of the barycenters of the grooves, and a chaining up (block 25, CHAIN) of the found barycenters, are applied, preferably in parallel for the different regions, as will be described hereafter in relation with FIG. 4. Chaining step 25 is, according to the present invention, followed by a pre-localization (block 26, PREDET) of the minutiae, that is, by a detection of the probable positions of the minutiae in the different regions along the line by line scanning of each region. Steps 23 to 26 have been gathered in dotted lines 28 and the output of step 26 has been looped back on the input of step 23 to underline the fact that they are performed line by line.

According to a preferred embodiment of the present invention, the regions are then gathered (block 27, REG-CHAIN) to optimize the minutia extraction and especially validate or invalidate the prelocalization.

Figure 4A:
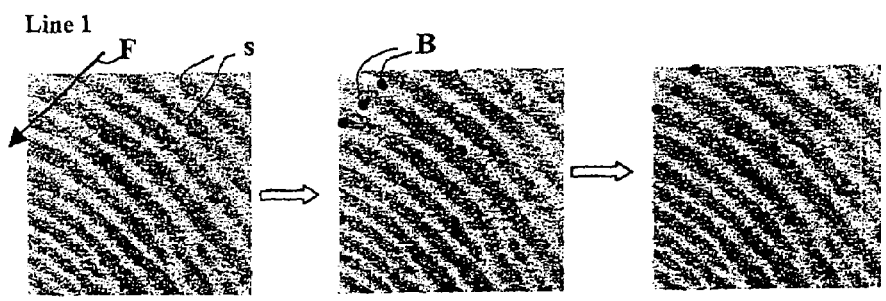
FIGS. 4A to 4C illustrate, by representations of a same image region, steps characteristic of the minutia extraction method according to a preferred embodiment of the present invention.
Figure 4B:
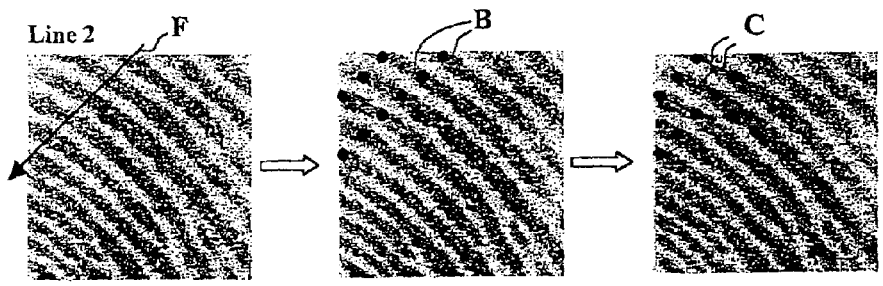
Figure 4C:
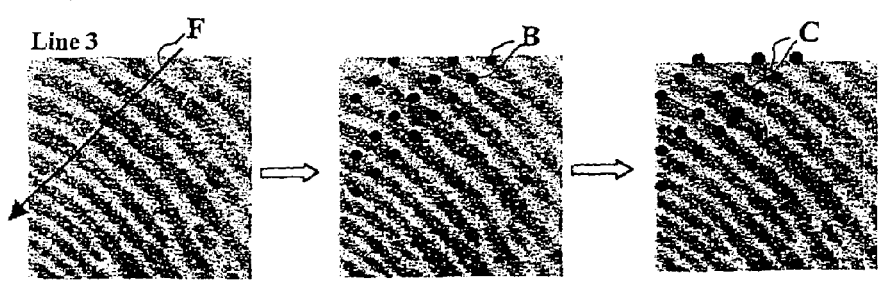

FIGS. 4A to 4C illustrate, by representations of a same image region of a fingerprint, an implementation mode of a phase characteristic of the present invention comprising of filtering in one direction (left-hand representations in the orientation of FIGS. 4A to 4C), of locating the barycenters of the grooves (central representations) and of chaining up the barycenters (right-hand representations) in a single go, that is, without requiring storage of the entire image after filtering, then of the entire image after localization, etc.

The processing performed by the present invention comprises processing, line after line, the image region, the scanning being performed approximately in the main groove direction, determined upon orientation of the regions or blocks.

FIGS. 4A to 4C show the processing of three successive lines (Line 1, Line 2, Line 3).

First (FIG. 4A), the first line (Line 1) is filtered in the direction (symbolized by arrows F in the left-hand representations) perpendicular to the orientation of the region, that is, approximately perpendicularly to the general direction of grooves s of the concerned region.

Conventional oriented one-dimensional filters may be used. For example, a so-called normalization filter or a Gabor filter may be used. This type of filter, well known in digital image processing, is described, for example, in publication "One-Dimensional Gabor Filtering for Texture Edge Detection" by B Yegnanarayana, G. Pavan Kumar and Sukhendu Das, of the Computer Vision Graphics and Image Processing conference of New-Dehli (India), Dec. 21 to 23, 1998, which is incorporated herein by reference.

Due to the performed filtering, the localization of the barycenters B of grooves s is performed by analyzing the intensity variations on a line perpendicular to the groove orientation. This analysis will be better understood upon reading of the description of FIGS. 5A and 5B which will be made hereafter.

Once the barycenters of the grooves have been located, since it is the first line of the processed region, the next line is filtered (FIG. 4B). Indeed, since the processing is oriented in the groove direction, it is useless to look for a chaining, the points (barycenters) found upon localization being necessarily, at least for the considered region, groove starting points.

Once the next line (Line 2) has been filtered, the localization of barycenters B is performed along this line, here again by analysis of the light intensity. Then, as illustrated by the right-hand representation of FIG. 4B, the possible chainings C between the points of the second line and the points of the first line are searched. Not all points in the first line form sequences of grooves having points on the first line. This results from the shape of the processed region (in this example, square).

The chaining is performed according to the present invention by examining, not only the barycenters, but also the edges of the grooves, the respective positions of which are evaluated upon localization as will appear from the description of FIG. 5. An example of a chaining will be detailed hereafter in relation with FIG. 6.

As illustrated in FIG. 4C, it is then proceeded to the next line (Line 3) to which the filtering, localization and chaining steps are applied, and so on for all the region lines. From one line to the next one, at least the information relative to the barycenters and edges of the grooves are kept (stored) to be able to perform the chaining.

According to the present invention, the determination of the position of the barycenter of a groove associated with the ongoing chaining enables directly obtaining the coordinates of some minutiae from as soon as the region-by-region processing. Indeed, if a point cannot be chained to another one of the region and its position does not correspond, based on the line to which it belongs, to an edge of the region, a groove end has been found, the coordinates of which can be recorded. Further, when two chains meet, that is, when two barycenters belonging to two distinct chains are very close to each other (for example distant by less than a predetermined number of pixels which is a function of the image definition), it can be considered that a branch has been found, the coordinates of which can then be recorded.

The only points which are not examined from the point of view of the existence of a minutia are the points located at the periphery of the region. It can indeed not be known at this stage if the groove continues on a next region or not.

As appears from the forgoing description, it is not necessary to restore (and thus to store) the entire image resulting from the filtering before applying thereto the subsequent processings. It is further not necessary either to restore the image after determination of the barycenters.

An advantage of the present invention is that it spares storing at least two complete image with respect to conventional methods (that resulting from the filtering and that resulting from the binarization). Further, even after the chaining, a complete storage can be spared and only three groove vectors associated with the barycenters of the periphery of the region need to be stored.

The chaining provided by the present invention enables, upstream, filtering in a single direction. Indeed, the information of links between barycenters no longer provided by the filtering is here obtained by the chaining. However, this not only simplifies the filtering, but also enables predetecting the minutiae along the processing. A step of search by bit-by-bit comparison as in conventional methods is thus avoided.

Preferably, the different regions are processed in parallel to save processing time. A compromise will be made between this processing time saving and the calculation power necessary for the parallel processing according to applications.

Once all regions have been processed, the coordinates of the branch-type minutiae as well as the probable coordinates of the end-type minutiae are already available. Ideally, end-type minutiae are not sure since they can mask a groove discontinuity astride two regions.

According to a simplified implementation, the minutia search processing ends here. Indeed, it can be considered that the obtained coordinates are valid, at least for branch-type minutiae. Thus, it is possible to set a threshold (for example, ranging between 20 and 50) of detected branch-type minutiae and only take into account afterwards the sole branch-type minutiae to perform the print comparison.

According to a preferred embodiment of the present invention, the different mappings of barycenters are chained to one another based on their respective coordinates in the entire image. The possible groove interruptions linked to the image shooting and digitizing imperfections, which should not be taken into account, are thus detected. If present, minutiae too close to one another may be eliminated. This last point remains optional since, in conventional techniques, the object of this sorting is to eliminate groove interruptions which, according to the present invention, are already eliminated upon chaining from one region to another.

Figure 5A:
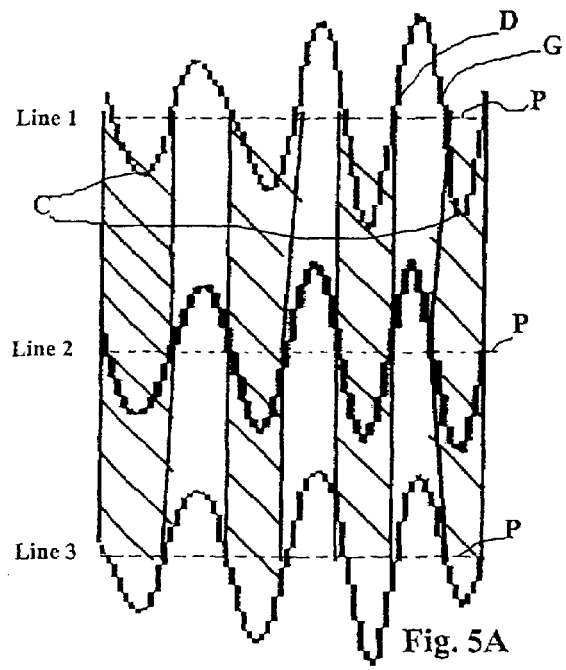
FIGS. 5A and 5B illustrate a step of analysis of the pixel intensity according to a preferred embodiment of the present invention.
Figure 5B:
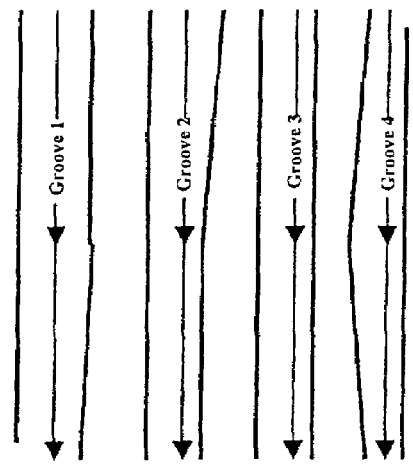

FIGS. 5A and 5B illustrate a preferred implementation mode of the barycenter search and chaining steps according to the present invention. FIG. 5A shows the result of the one-directional filtering performed at step 23 for three successive lines (Line 1, Line 2, Line 3) in the general direction of the grooves of a same region of the type of that illustrated in FIGS. 4A to 4C, and illustrates the determination of the barycenters (step 24). FIG. 5B illustrates the result of the chaining (step 25) based on this determination. In FIG. 5A, the respective intensities of the output signal of the filter (for example, Gabor) have been shown above one another for the three successive lines. In other words, the vertical direction of FIGS. 5A and 5B corresponds to the direction perpendicular to that of arrows F of FIGS. 4A to 4C, and thus to the orientation of the Gabor filter.

To analyze the intensity of the filter's output signal, this signal is centered, for example, with respect to the mean value (dotted lines p on the representations of lines 1, 2, and 3 in FIG. 5A) of the signal. In fact, this value may correspond to the mean light intensity of the region, possibly empirically weighted. It may be determined from as soon as the beginning of the filtering and be refined along the line scanning.

As compared to this mean value, valleys exhibit higher light intensities and the bottoms of the grooves smaller light intensities (or conversely, according to whether the image is positive or negative). In fact, the signal oscillates around mean value p at the rate of the groove crossing. It should be recalled that the scanning of the region is oriented so that direction F of the filter is approximately perpendicular to the groove direction in the concerned region. The zero crossings (centering on the mean value) of the signal which surround a negative value correspond to the edges (right-hand D and left-hand G) of the corresponding groove. Preferably, an uncertainty range is defined around the mean value, within which the signal peaks are ignored to avoid taking artifacts into account.

The representation of FIG. 5A shows four negative peaks, and thus four grooves. These peaks are found again in the next lines. The approximately vertical full lines join respective edges G and D of the grooves (the zero crossings of the signals). Barycenters B of the grooves on the different lines correspond to the middle of the interval between the two zero crossings which surround the negative peaks of the signals.

In FIG. 5B, only the groove edges and the grooves have been shown. This corresponds to the result of the chaining performed at step 25. This chaining will be better understood on reading the following description in relation with FIG. 6.

Figure 6:
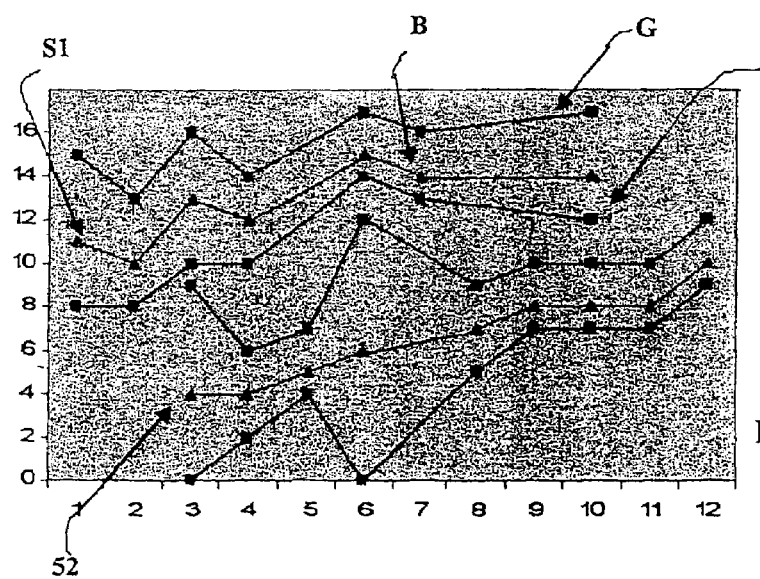
FIG. 6 illustrates a step of chaining up of the barycenters of the grooves located according to a preferred embodiment of the present invention.

FIG. 6 shows an example of a chaining of barycenters B (illustrated by triangles) of the grooves as well as of right-hand D or left-hand G edges (illustrated by squares) of the grooves. For simplification, the representation of FIG. 6 has been made assuming a horizontal orientation of the grooves of the concerned region. As for FIGS. 4 and 5, it should be recalled that the analysis is performed line by line, that is, horizontally in the representation of FIG. 6. The units of the horizontal axis correspond to the line number (and thus to the rank of the pixel processed in the region). The vertical axis units correspond to the rank of the pixel processed along a line.

From the result of the preceding step of analysis of the intensity after filtering, the positions (coordinates) of the barycenters and of the groove-edges are known for the current line. To connect a barycenter of the current line to a barycenter of the preceding line, the edges of the groove which would result therefrom between the current and preceding line are examined. If these edges approximately follow the same direction as the barycenters, it is considered that it is the same groove and the barycenters are chained (connected). In practice, the coordinates of the barycenters associated with a groove order number sequentially given in the processing are, for example, recorded. The notion of proximity (in number of pixels) between the shapes followed by the edges and the barycenters especially depends on the image definition, and on the dimensions of the regions which condition the probability of "turns" in the grooves within the same region. Since the region is oriented, the main approximate orientation of the grooves is already known. It is thus possible to properly match the barycenters from one line to the next, and not to "skip" from one groove to the next groove by changing lines. The thresholds which result therefrom for a digital processing are within the abilities of those skilled in the art. If a current barycenter cannot be linked to a preceding barycenter, it is considered that it forms the starting point of a new chain (and thus possibly a minutia of end type). Similarly, it is considered that a barycenter of the preceding line which has found no successor in the current line forms, at least for the considered region, a chain end (and thus possibly a minutia of end type).

In the representation of FIG. 6, it is assumed that a groove S1 starts from the first line and ends at line 10, while a second groove S2 starts from line 3 and continues to at least the end of the region (here assumed to be comprised of 12 lines, for simplification).

It can thus be seen that ends are detected from as soon as the regions are being scanned. It should be noted that the more these ends are centered in a region (of course assuming that the regions have sufficient sizes according to the image definition), the less risks there are for it to be an incidental interrupt. Minutiae of end type may thus be validated from as soon as the line-by-line examination. Similarly, if a groove starts from another one (or in the vicinity of another one with a spacing threshold adapted to the image definition), it is then considered that it is a minutia of branch type, without it being necessary to wait for the chaining of the different regions.

It should be noted that the coordinates of the minutiae determined in this phase line by line are well identified in the entire image by their coordinates. This is thus compatible with a digital fingerprint comparison.

The chaining of the regions according to the preferred embodiment of the present invention introduces a better determination at the interfaces between regions. In particular, it is possible for an end detected at the edge of a region to actually correspond to the beginning of a branch from another groove appearing on a neighboring region. In the case of a chaining of the regions, the groove vectors at the edges of the different regions will preferentially be stored to be able to perform the necessary connections. It is not however necessary to store all the points detected within the regions. Storage of the predetected minutiae is sufficient.

As an alternative, rather than performing a chaining of the regions, an overlapping of the regions may be provided upon cutting up of the image. The chaining is then automatic by the determination of minutiae having the same coordinates in the entire image.

An advantage of the present invention is that it enables getting rid of the problems linked to the discontinuity of the grooves due to inaccuracies in the image digitization.

Another advantage of the present invention is that it considerably simplifies the filtering and the determination calculations. In particular, the fact of avoiding systematic examination of the entire restored image saves considerable time.

Of course, the present invention is likely to have various alterations, modifications, and improvements which will readily occur to those skilled in the art. In particular, the hardware or software programming of conventional tools (state machines in wired logic or microprocessors) of the implementation of the present invention is within the abilities of those skilled in the art based on the functional indications given hereabove. Further, the choice of the filter (for example, a Gabor or normalization filter) depends on the application and is within the abilities of those skilled in the art. In the case of a normalization filter, filtering and localization steps 23 and 24 of the barycenters may be one and the same.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for extracting a minutia mapping from a digital image, comprising the steps of:
   dividing the image into regions;
   defining an orientation of each region based on the general direction of grooves in this region; and
   successively for each region:
      unidirectionally filtering the image portion along a direction perpendicular to the orientation of the region;
      locating the barycenters of the grooves based on the intensity of the filtering results;
      chaining up the barycenters along the general direction of the region grooves; and
      interpreting the results of the chaining to determine the presence of minutiae of end type or of branch type;
   wherein the locating of the barycenters of the grooves is performed by centering the intensity in grey levels resulting from the filtering with respect to a mean value of the intensity in the concerned region.

2. The method of claim 1, wherein the filtering, the locating of the barycenters and the chaining are performed line after line according to the orientation of the concerned region.

3. The method of claim 2, wherein the interpretation of the results is performed line after line according to the orientation of the concerned region.

4. The method of claim 1, wherein the barycenters present at the limit of a region are chained up with those of the next regions.

5. The method of claim 1, wherein upon locating of the barycenters, the edges of the groove surrounding each barycenter are also located.

6. The method of claim 5, wherein the chaining up of the barycenters takes into account the shape of the surrounding edges.

7. A system for extracting minutiae from a digital fingerprint image, comprising means for implementing the method of claim 1.

8. A method comprising:
   dividing a digital image comprising a fingerprint into at least one sub-image, and for each sub-image of the at least one sub-image:
   determining a general orientation of grooves in the sub-image and
   performing a plurality of successive processing acts on the sub-image,
   wherein a successive processing act comprises:
      unidirectionally filtering the sub-image along a line in a direction perpendicular to the general orientation;
      locating, in the sub-image, barycenters of the fingerprint grooves intersected by the line;
      identifying connections between the fingerprint grooves intersected by the line and fingerprint grooves intersected by previous lines; and
      determining the presence of ridge-type or end-type minutiae based at least in part on the connections.

9. The method of claim 8, further comprising locating edges of the fingerprint grooves.

10. The method of claim 9, wherein the barycenters and the edges are used in identifying the connections.

11. The method of claim 8, wherein the locating of the barycenters of the fingerprint grooves is performed by centering the intensity in grey levels resulting from the filtering with respect to a mean value of the intensity in the concerned region.

12. A computer apparatus comprising at least one computer-readable medium having encoded thereon computer-readable instructions which cause a computer to execute a method, the method comprising:
   dividing a digital image comprising a fingerprint into at least one sub-image, and
   for each sub-image of the at least one sub-image:
      determining a general orientation of grooves in the sub-image and
      performing a plurality of successive processing acts on the sub-image,
      wherein a successive processing act comprising:
         unidirectionally filtering the sub-image along a line in a direction perpendicular to the general orientation;
         locating, in the sub-image, barycenters of the fingerprint grooves intersected by the line;
         identifying connections between the fingerprint grooves intersected by the line and fingerprint grooves intersected by previous lines; and
         determining the presence of ridge-type or end-type minutiae based at least in part on the connections.

13. The computer apparatus of claim 12, the method further comprising locating edges of the fingerprint grooves.

14. The computer apparatus of claim 13, wherein the barycenters and the edges are used in identifying the connections.

15. The computer apparatus of claim 12, wherein the locating of the barycenters of the fingerprint grooves is performed by centering the intensity in grey levels resulting from the filtering with respect to a mean value of the intensity in the concerned region.

* * * * *